(12) United States Patent
Morawitz et al.

(10) Patent No.: US 10,922,905 B2
(45) Date of Patent: Feb. 16, 2021

(54) TRACKED VEHICLE

(71) Applicant: CLAAS Industrietechnik GmbH, Paderborn (DE)

(72) Inventors: Martin Morawitz, Salzkotten (DE); Jan-Willem Verhorst, Lippstadt (DE); Peter Meyer, Grosshansdorf (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 143 days.

(21) Appl. No.: 16/181,652

(22) Filed: Nov. 6, 2018

(65) Prior Publication Data

US 2019/0139335 A1 May 9, 2019

(30) Foreign Application Priority Data

Nov. 8, 2017 (DE) .......................... 102017126133.8

(51) Int. Cl.
*G07C 5/08* (2006.01)
*B60W 40/02* (2006.01)
(Continued)

(52) U.S. Cl.
CPC ............ *G07C 5/0808* (2013.01); *A01B 61/00* (2013.01); *B60W 40/02* (2013.01); *B62D 55/08* (2013.01);
(Continued)

(58) Field of Classification Search
CPC ............ A01B 61/00; B60K 2370/1442; B60K 2370/171; B60K 2370/172; B60K 2370/176; B60K 2370/1876; B60K 2370/566; B60K 2370/573; B60K 2370/5899; B60K 2370/592; B60K 35/00; B60K 37/06; B60W 2050/146; B60W 2300/15; B60W 2520/10; B60W 2530/14; B60W 2530/20; B60W 2552/05;
(Continued)

(56) References Cited

U.S. PATENT DOCUMENTS 6,044,313 A 3/2000 Gannon
8,065,061 B2 11/2011 O'Neal
(Continued)

FOREIGN PATENT DOCUMENTS

DE 112008003244 T5 10/2010
WO 2017000068 A1 1/2017
WO 2017049383 A1 3/2017

OTHER PUBLICATIONS

European Search Report dated May 8, 2019 in European Application No. EP 18 20 1698 with English translation of the relevant parts.
(Continued)

*Primary Examiner* — Babar Sarwar
(74) *Attorney, Agent, or Firm* — Collard & Roe, P.C.

(57) ABSTRACT

An agricultural tracked vehicle has a ground drive including at least two ground drive wheels. Ground engagement elements are assigned to individual ground drive wheels and/or units comprising several ground drive wheels. An evaluation device is provided, which is configured for ascertaining an operating state of at least one of the ground engagement elements based at least on one or several state variables of the surroundings and/or vehicle-independent, device-specific sensor data.

13 Claims, 5 Drawing Sheets

(51) Int. Cl.
  *G01M 17/03*  (2006.01)
  *A01B 61/00*  (2006.01)
  *B62D 55/08*  (2006.01)
  *G07C 5/00*   (2006.01)
(52) U.S. Cl.
  CPC ........... *G01M 17/03* (2013.01); *G07C 5/0825* (2013.01); *G07C 5/008* (2013.01); *G07C 2205/02* (2013.01)
(58) Field of Classification Search
  CPC ......... B60W 2555/20; B60W 2556/50; B60W 40/02; B60W 40/12; B62D 55/08; G01M 17/03; G07C 2205/02; G07C 5/008; G07C 5/0808; G07C 5/0825
  See application file for complete search history.

(56) References Cited

U.S. PATENT DOCUMENTS

| | | | | |
|---|---|---|---|---|
| 2012/0306916 | A1* | 12/2012 | Marumoto | G01B 11/24 345/632 |
| 2014/0105481 | A1* | 4/2014 | Hasselbusch | G06T 7/0006 382/141 |
| 2017/0091924 | A1* | 3/2017 | Hasselbusch | G06T 7/60 |
| 2018/0265145 | A1* | 9/2018 | Todd | B62D 55/244 |

OTHER PUBLICATIONS

European Search Report dated .Feb. 27, 2019 in European Application No. EP 18 20 1677 with English ranslation of the relevant parts.

* cited by examiner

TRACKED VEHICLE

CROSS-REFERENCE TO RELATED APPLICATIONS

This application claims priority under 35 USC 119 of German Application No. 102017126133.8, filed on Nov. 8, 2017, the disclosure of which is herein incorporated by reference.

BACKGROUND OF THE INVENTION

The invention relates to a tracked vehicle, in particular, an agricultural tracked vehicle, and to a method for detecting the operating state and/or determining the service life of at least one ground engagement element of a tracked vehicle.

A tracked vehicle within the scope of the invention is understood to be any form of vehicle comprising a crawler track assembly and, if necessary, an additional wheeled travel mechanism. A tracked vehicle comprises, in particular, a separate ground drive for generating a propulsion, although it can also be a non-driven vehicle, for example, a trailer. Although there is a plurality of different applications which are encompassed by the present invention, the focus in the following is on tracked vehicles for carrying out agricultural work, which are referred to here as agricultural tracked vehicles. Tractors and self-propelled harvesting machines, such as combine harvesters or forage harvesters, are mentioned merely by way of example.

Vehicles of this type can be designed as a tracked vehicle or a half-track vehicle. Half-track vehicles comprise a crawler track assembly including at least one track-laying unit, in particular including two track-laying units positioned opposite one another relative to the vehicle longitudinal axis (direction of travel). The track-laying units each comprise, in turn, several rollers which are connected to one another via a revolving ground engagement means in the form of a track belt (moving belt) or a rubber belt (track chain). For example, track-laying units are known, which comprise a drive roller driven by the ground drive, a guide roller, and land rollers situated therebetween. In another variant, the so-called triangular traction unit, the track-laying unit comprises two guide rollers and a drive wheel situated above these, in the center. The focus here is to be on the variant of a vehicle comprising a rubber track.

Crawler track assemblies are often utilized on agricultural vehicles which have a high axle load. During road travel, the outer lugs of the track belts or, in the case of rubber belts, the track pads, are subject to a high temperature load because, when they are located under the land rollers, they are repeatedly compressed and unloaded and, due to the hard pavement, cannot escape into the ground. Due to the energy which is introduced, the outer lugs become hot. In the case of high ambient temperatures and a long drive time, the temperature in the outer lugs can increase to such an extent that they "boil up". The bead forming as a result then results in a greatly increasing wear of the particular track belt. In addition, the outer lugs wear comparatively rapidly due to the abrasive pavement. A high temperature makes the rubber material softer and therefore has a wear-promoting effect. This disadvantageous effect frequently occurs specifically during transport travel and when there is a high specific load on the track belts, which significantly increases the wear costs for the end customer.

The agricultural vehicle (U.S. Pat. No. 6,044,313 A), on which the invention is based, is designed as an off-road mining truck for hauling overburden material. This comprises a wheeled travel mechanism which includes multiple ground drive wheels which comprise large-volume tires as ground engagement elements. In the case of this agricultural vehicle, an estimate of the wear of the ground engagement elements is based on the ascertained ton-miles-per-hour which are related to a temperature of the tires. By storing such data over a certain time interval, a development of wear can also be detected, which also allows for an estimate of the remaining service life. From DE 11 2008 003 244 T5 it is also known to adapt a speed limit in order to reduce the wear of the tires with the aid of a payload control system based on vehicle-side force and speed sensors. The disadvantage of all these systems, however, is that vehicle-side sensors must be present or scaffolded and, therefore, the system is bound to the vehicle.

It is also known from the related art to provide temperature sensors in the ground engagement elements, which wirelessly transmit a temperature signal which can be used as a piece of driver information or for regulating the machine in order to avoid a critical state of wear. Such sensors in the ground engagement elements, for example, in the track belt, mean additional manufacturing costs, however, especially since the production technology for introduction into the rubber material is not simple. In addition, the sensors are utilized in critical environmental conditions (extreme temperatures, vibrations) which increase the risk of failure. Moreover, the environmental conditions for a wireless transmission of a sensor signal are not ideal, either.

The problem addressed by the invention is that of designing and refining the known tracked vehicle in such a way that a detection of an operating state and/or a determination of the service life of the ground engagement elements are optimized.

SUMMARY OF THE INVENTION

The aforementioned problem is solved in the case of a tracked vehicle in the form of an agricultural tracked vehicle, comprising a ground drive including at least two ground drive wheels, wherein ground engagement elements are assigned to individual ground drive wheels and/or units comprising several ground drive wheels. An evaluation device is provided, which is configured for ascertaining an operating state of at least one of the ground engagement elements based at least on one or several state variables of the surroundings and/or vehicle-independent, device-specific sensor data.

The approach according to the invention is based on the fundamental consideration that a detection of an operating state of one or several of the ground engagement elements takes place based on parameters which can be ascertained independently of the vehicle, i.e., without the need for vehicle-specific sensors. These include state variables of the surroundings (surroundings parameters) and/or operating parameters which can be ascertained without vehicle-specific sensors, for example, the vehicle speed or the GPS position or geoposition, to name only a few examples. Due to the fact that such parameters are utilized for ascertaining the operating state, a detection of the operating state can be carried out, in this way, by ground engagement elements, independently of the vehicle. If operating states are regularly detected, the remaining service life of the ground engagement means can also be determined on the basis thereof.

Specifically, an evaluation device is provided, which is configured for ascertaining an operating state of at least one of the ground engagement elements based at least on one or several state variables of the surroundings and/or vehicle-independent, device-specific sensor data. The operating state or the state of wear can be ascertained, for example, on the basis of the particular ground being traveled on (road, field, or the like), the speed, the driving duration, the ambient temperature, etc., to name only a few examples. In this case, "vehicle-independent" means that the sensor data are not generated by vehicle-specific sensors, but rather by device-specific sensors, i.e., sensors of the evaluation device.

The approach according to the invention can be applied to all types of ground drives, for example, to crawler track assemblies, wheeled travel mechanisms, or combinations thereof, in particular, half-track crawler assemblies. Correspondingly, the ground engagement means can be track belts (moving belts), rubber belts, and/or tires. In the following, the focus will be on a ground drive including track belts and comprising a crawler track assembly, however. The particular ground drive, such as in the form of a crawler track assembly, can furthermore comprise a driven ground drive wheel, although it can also be without a drive, for example, in the case of a trailer. Correspondingly, the tracked vehicle can be equipped with or without a ground drive for generating a propulsion.

According to one particularly preferred embodiment, the evaluation device is a mobile evaluation device, i.e., an evaluation device which is not necessarily fixedly connected to the vehicle. A mobile evaluation device is, in particular, a smartphone, a tablet computer, a notebook, or the like. One essential advantage in this case is that such an evaluation device can be carried along by any operator, which is common anyway nowadays, in particular, in the case of a smartphone, whereby the evaluation device can also be utilized for different tracked vehicles, in particular, agricultural tracked vehicles.

According to another embodiment, the state variable or the state variables of the surroundings can be directly ascertained by the evaluation device, in that these are retrieved by the evaluation device, for example, from the Internet or databases remote from the vehicle. State variables of the surroundings can be, in particular, the ambient temperature and/or weather data (rain, drought, etc.).

According to another embodiment, the sensor data which can be vehicle-independent, are generated by at least one sensor of the evaluation device. Such vehicle-independent sensor data are, for example, the vehicle speed, the GPS position or geoposition (road, field, etc.) of the vehicle and/or acceleration data (G forces during cornering, when the vehicle starts moving, and/or during deceleration) of the vehicle. The evaluation device can therefore comprise a speed sensor, a GPS sensor, and/or an acceleration sensor.

According to the further preferred embodiment, the evaluation device also allows for the input, by the operator, of vehicle-specific data, and/or state variables of the surroundings. Additionally or alternatively, the evaluation device can also be configured for receiving vehicle-specific data and/or state variables of the surroundings. Appropriate data may have been gathered in advance, for example, via a driver assistance system of the vehicle or via the, in particular, mobile, evaluation device, preferably in the form of a smartphone or the like. For this purpose, it is also conceivable to equip the evaluation device with appropriate application software, in particular, via a mobile app, which evaluates weather data, GPS positions, geodata, etc. Vehicle-specific data which can be entered and/or received via or by the evaluation device are, according to claim 8, for example, the vehicle type, the particular axle load, the age of the particular ground engagement elements, the profile depth or lug height of the particular ground engagement means, and/or the width of the inner guide blocks (guide teeth) of the particular ground engagement element, etc.

According to the further embodiment, vehicle-specific sensor data can also be utilized, in principle, for ascertaining the operating state of the particular ground engagement means. It is preferred, however, to base the ascertainment of the operating state preferably exclusively on parameters which can be ascertained independently of vehicle-specific sensors.

The ascertained operating states can be utilized in many ways. For example, pieces of driver information corresponding to the particular ascertained operating state can be displayed and/or a regulation of the vehicle, for example, the vehicle speed, can take place. Such a regulation takes place, in particular, automatically, i.e., without the need for interventions by the operator, via a driver assistance system of the tracked vehicle. The pieces of driver information can also encompass the operating state or the state of wear and/or the remaining service life and/or recommendations for the ground speed and/or maintenance. It is particularly preferred when certain pieces of driver information, in particular, the operating state or the state of wear, are graphically displayed, which can take place, in particular, in real time, with the aid of so-called augmented reality. The latter makes it possible, for example, to visually record the particular ground engagement means with the aid of the camera of a mobile evaluation device, for example, a smartphone, wherein the state of wear can be simultaneously visually displayed on the reproduced image, via the principle of augmented reality, for example, by way of a coloration of the represented ground engagement means.

According to a preferred embodiment, the particular ascertained operating state can be stored in a memory. In particular, the ascertained states of wear can be gathered in the memory, whereby the evaluation device can then infer the remaining service life.

It is particularly preferred when the approach according to the invention makes it possible to omit appropriate sensors for ascertaining the operating state, which are provided within the ground engagement means.

The invention also relates to a method for detecting the operating state and/or determining the service life of at least one ground engagement means of a tracked vehicle, in particular, a tracked vehicle as described above, in which a ground engagement means is assigned to individual ground drive wheels and/or units comprising several ground drive wheels of a ground drive of the tracked vehicle. According to the invention, an evaluation device ascertains an operating state of at least one of the ground engagement elements based at least on one or several state variables of the surroundings and/or vehicle-independent, device-specific sensor data.

BRIEF DESCRIPTION OF THE DRAWINGS

The invention is explained in the following in greater detail with reference to a drawing representing only one exemplary embodiment. In the drawings.

DETAILED DESCRIPTION OF THE EMBODIMENTS

Figure 1:
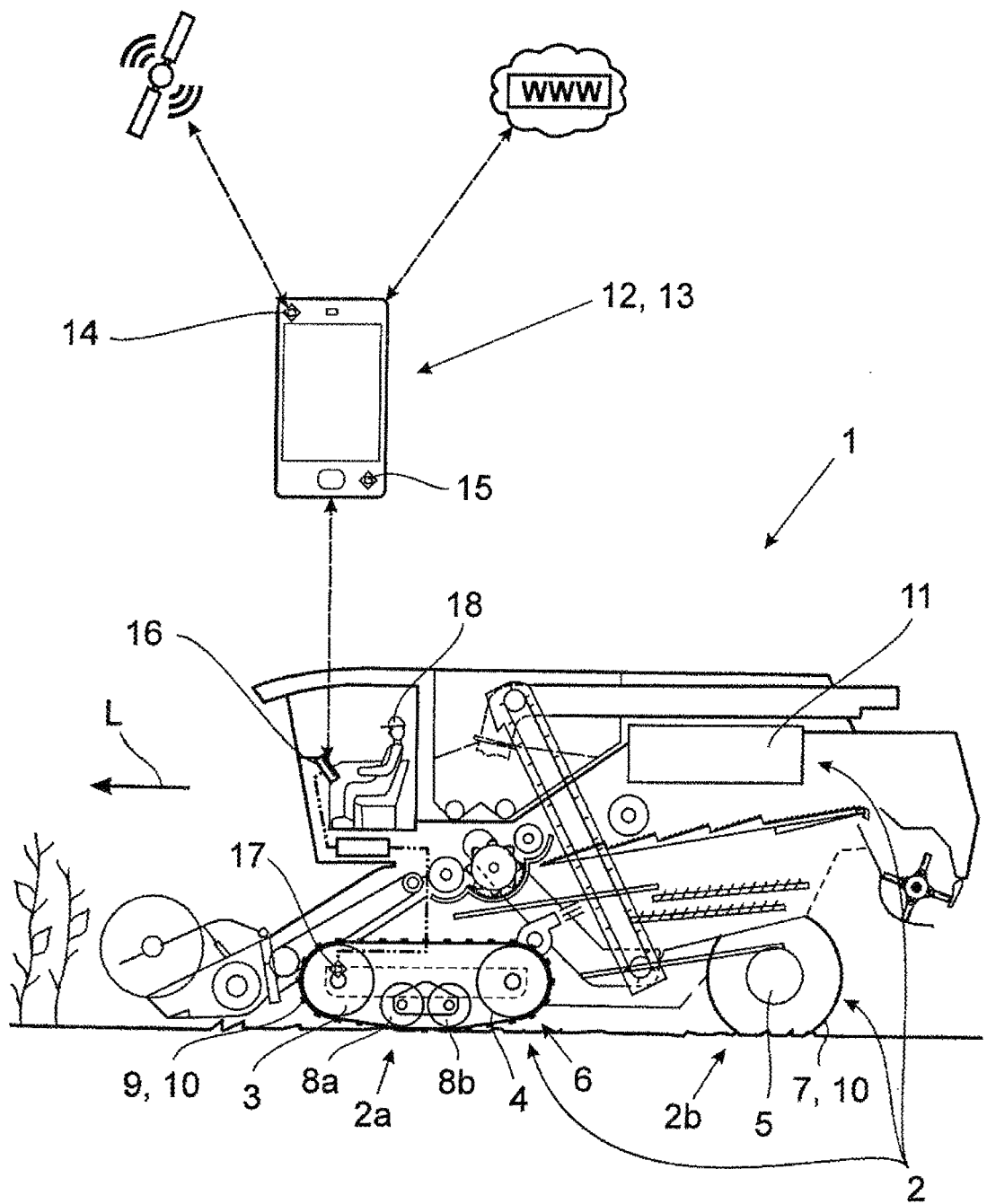
FIG. 1 shows a tracked vehicle according to the invention in the form of an agricultural vehicle comprising a half-track crawler assembly and a mobile evaluation device.

The tracked vehicle according to the invention, which is designed as an agricultural tracked vehicle 1 in this case, by way of example, can be designed in highly different ways. For example, the agricultural vehicle 1 can be a tractor, self-propelled harvesting machine, such as a combine harvester or a forage harvester, or a driven or non-driven trailer. The benefits of the approach according to the invention are particularly clear in tracked vehicles or half-track vehicles comprising a crawler track assembly. In the exemplary embodiment which is represented and, in this respect, is preferred, the agricultural vehicle 1 is a combine harvester comprising a half-track crawler assembly, as will be explained further below.

The ground drive 2 of the agricultural vehicle 1 described here by way of example comprises at least two ground drive wheels 3 to 5, which are positioned opposite one another relative to the vehicle longitudinal axis or the direction of travel L. In the view in FIG. 1, only the left ground drive wheels 3 to 5 are apparent. Relative to the vehicle longitudinal axis or the direction of travel L, corresponding ground drive wheels 3 to 5 are positioned opposite these ground drive wheels 3 to 5. In this case, the ground drive wheels 3, 4 are components of a crawler track assembly 2a and the ground drive wheels 5 are components of a wheeled travel mechanism 2b. Correspondingly, the ground drive wheels 3, 4 run in assigned track-laying units 6, whereas the ground drive wheels 5 roll via tires 7 on the ground. The term "ground drive wheel" is therefore to be broadly understood in the present case. It encompasses wheels which are assigned to a crawler track assembly 2a and run in corresponding track-laying units 6, as well as wheels which are assigned to a wheeled travel mechanism 2b and are each provided with a tire 7. It is to be noted that, although multiple track-laying units 6 are under discussion here, it is also generally conceivable to provide only one single track-laying unit 6.

The crawler track assembly 2a comprises, in this case, two track-laying units 6 which are positioned opposite each other relative to the vehicle longitudinal axis or the direction of travel L and each comprise a front ground drive wheel 3 as the guide wheel or guide roller, a rear ground drive wheel 4 as the drive wheel or drive roller, and two land wheels or land rollers 8a, 8b located therebetween. The track-laying units 6 also each comprise a track belt 9 which connects the ground drive wheels 3, 4 and land wheels or land rollers 8a, 8b. The land wheels or land rollers 8a, 8b hold the lower segment of the particular track belt 9 in continuous contact with the ground, and so a uniform weight distribution over the entire contact area between the ground and the particular track belt 9 results. In principle, other types of track-laying units are also conceivable, which have, for example, a triangular shape including two guide rollers which establish the continuous ground contact, and a drive roller situated above these, in the center (triangular traction unit).

The tires 7 and the track belts 9 form ground engagement elements 10 in this case. The approach according to the invention can also be applied to a track or track chain comprising several steel contact face sections which can be provided with rubber pads, as an alternative to a track belt 9 as ground engagement means 10, whereby the intention here is a moving belt comprising several layers of woven fabric and steel, which are extrusion-coated with rubber.

Moreover, a ground drive 11 for generating a propulsion of the agricultural vehicle 1 is provided here and preferably, although not necessarily in the case of a non-driven trailer. In the exemplary embodiment represented here, the ground drive wheels 4 can also be driven by the ground drive 11. In principle, it is also conceivable, additionally or alternatively, that the ground drive wheels 3 of the crawler track assembly 2a or all ground drive wheels 3 to 5 of the agricultural vehicle 1, overall, can be driven by the ground drive 11.

It is essential that an evaluation device 12 is provided, which is configured for ascertaining an operating state of at least one of the ground engagement elements 10, in this case and preferably, the track belt 9, and, in fact, based on state variables of the surroundings and/or based at least on vehicle-independent, device-specific sensor data. In this case and preferably, the "operating state" refers to the state of wear of the particular ground engagement element 10. Since state variables of the surroundings can be ascertained or generated without vehicle-specific sensors, as is also the case with the device-specific sensor data, i.e., the sensor data generated by the evaluation device 12 itself, an operating state of the particular ground engagement element 10 can be ascertained independently of the vehicle 1 itself. It is particularly preferred when the evaluation device 12 is a mobile evaluation device 12, in this case, for example, a smartphone 13. The operator 18 usually carries such an evaluation device anyway, and so the ascertainment of the operating state of the particular ground engagement element 10 can therefore take place for every agricultural vehicle 1 which can be operated by the operator 18, in particular, every agricultural vehicle 1 of a work collective.

Alternatively to the smartphone 13 represented in FIG. 1, a tablet computer, notebook, or the like, for example, can also be provided as the evaluation device 12, in particular as a mobile evaluation device 12. Preferably, the evaluation device 12 comprises a keypad, and/or a screen, wherein it is particularly preferred when a touchscreen, in particular, comprising virtual control elements, is provided.

The state variable or state variables of the surroundings is/are ascertained by the evaluation device 12, namely the smartphone 13 in this case. The ascertainment of the state variables takes place, in particular, by retrieving appropriate information from the Internet, which is symbolized here with "www". Examples of such state variables of the surroundings are, in this case, the ambient temperature at the location of the tracked vehicle 1 and/or the weather data for that location. These state variables are particularly important with respect to the ascertainment of the operating state of the particular ground engagement element 10, since the wear is affected by the temperature as well as by the weather or the humidity or dryness. At high temperatures, the temperature of the outer lugs of the crawler track assembly 2a can increase to such an extent that the outer lugs boil up or vulcanize, in particular, during a long drive time on hard pavement. A bead can form as a result, which additionally increases the wear.

In addition to the ascertainment of the state variables of the surroundings, the evaluation device 12 is also provided with sensors 14, 15, with the aid of which the aforementioned device-specific sensor data can be generated. In this case, the sensors are a GPS sensor 14 and an acceleration sensor 15. With the aid thereof the vehicle speed, the GPS position, geodata, and/or acceleration data of the tracked vehicle 1 can be ascertained. It is also conceivable to provide an evaluation device 12 which comprises a separate speed sensor which ascertains the speed of the vehicle 1 directly and not via the change of the GPS position, as is the case here. The sensor data generated in this way are also relevant for the ascertainment of the operating state of the particular ground engagement element 10, since the vehicle speed, the pavement which can be ascertained via the vehicle position, and the acceleration of the vehicle 1 during the start or deceleration or cornering also affect the wear of the particular ground engagement means 10 and, in particular, of the outer lugs of the particular track belt 9. Pavements have a considerably more abrasive effect than the ground surface of agricultural paths for an agricultural field. The wear also increases as a result of high speeds and high acceleration values.

Moreover, the evaluation device 12 is configured, in this case, for input by the operator and also for receiving vehicle-specific data. Vehicle-specific data such as the vehicle type, the axle load, the age of the particular ground engagement means 10 or of the track belt 9, the profile depth or height of the outer lugs of the particular ground engagement element 10, and/or the width of the inner guide blocks or teeth of the particular ground engagement element 10 are also parameters which characterize the operating state of the particular ground engagement element 10. The appropriate data can be entered by the operator via the evaluation device 12 or the smartphone 13, although the data can also be received by the evaluation device from a driver assistance system 16 of the, in this case, agricultural, tracked vehicle 1. Such a driver assistance system 16 can ascertain, for example, the axle load via an appropriate sensor 17 and then forward the values to the evaluation device 12, namely the smartphone 13 in this case. The vehicle type can also be transmitted, in particular, automatically, for example, from an appropriate driver assistance system 16 to the evaluation device 12.

In principle, in addition to the axle load sensor 17, which is optionally mentioned here, other vehicle-specific sensors (not represented here) can also be provided, the sensor data of which can be taken into account in the ascertainment of the operating state of the particular ground engagement element 10. It is particularly preferred when the ground engagement element 10 itself comprises no separate sensors, however, which are utilized for determining the particular operating state. Finally, data via external databases, for example, data from a farm-based computer or the like, can be taken into account.

Based on the ascertained operating state of the particular ground engagement element 10, the evaluation device 12 can now display one or several pieces of driver information, which is represented in FIGS. 2 to 5 with reference to different exemplary embodiments. The evaluation device 12 can also be configured for bringing about a display of such pieces of driver information in the driver assistance system 16. Furthermore, it can be provided that the evaluation device 12 brings about an automatic regulation of the tracked vehicle 1, in particular, its speed, which can also be brought about with the aid of the driver assistance system 16 of the tracked vehicle 1. For this purpose, the mobile evaluation device 12 can communicate, preferably wirelessly, with the driver assistance system 16 of the vehicle 1.

Figure 2:
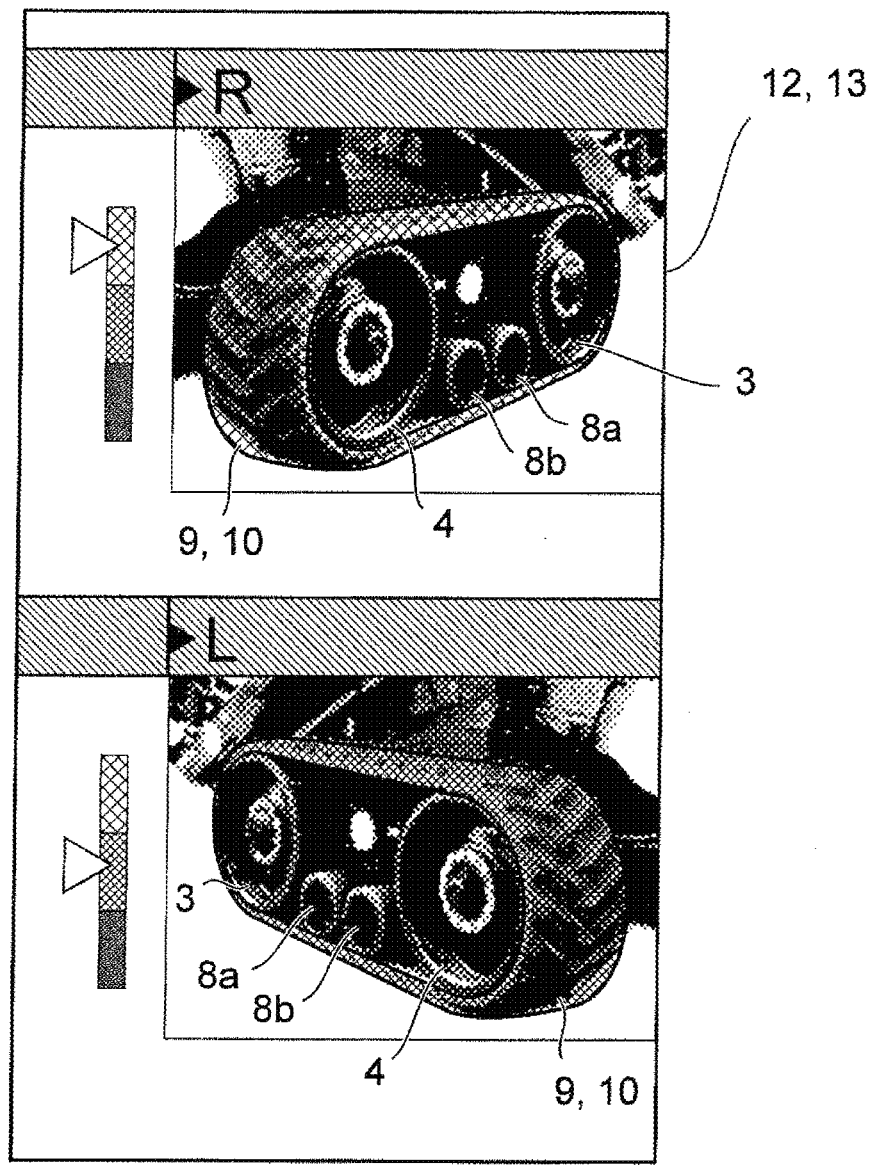
FIG. 2 shows a representation of pieces of driver information according to a first exemplary embodiment.

In FIG. 2, by way of example, an augmented reality-based visualization of an operating state or a state of wear of the particular ground engagement element 10, namely the track belt 9 in this case, is now represented on the smartphone 13 shown in FIG. 1. The visualization of the state of wear takes place, in this case and preferably, via a coloration of the real image of the particular ground engagement element 10 or the track belt 9 in real time. The visual representation takes place, in this case, via the device-specific camera of the evaluation device 12 or of the smartphone 13. After an appropriate computer program or an appropriate mobile app for detecting the operating state and/or determining the service life has been called up on the evaluation device 12, the operator 18 merely needs to direct the device-specific camera toward the particular ground engagement element 10 or track belt 9, whereupon the software carries out the particular coloration of the ground engagement means 10 or the track belt 9 in real time. The coloration is selected depending on the state of wear. For example, when there is no wear or there is at least wear that is not critical, a green coloration takes place. In the case of a high degree of wear or a critical level of wear, however, a red coloration takes place. At least one intermediate stage, for example, symbolized by a yellow coloration, is also conceivable, when the wear is not yet critical, but maintenance in the near future is recommended. In the exemplary embodiment from FIG. 2, a critical degree of wear of the right track belt 9 is displayed, for example, in the top view. A moderate degree of wear of the left track belt 9 is displayed in the lower view, however.

Figure 3:
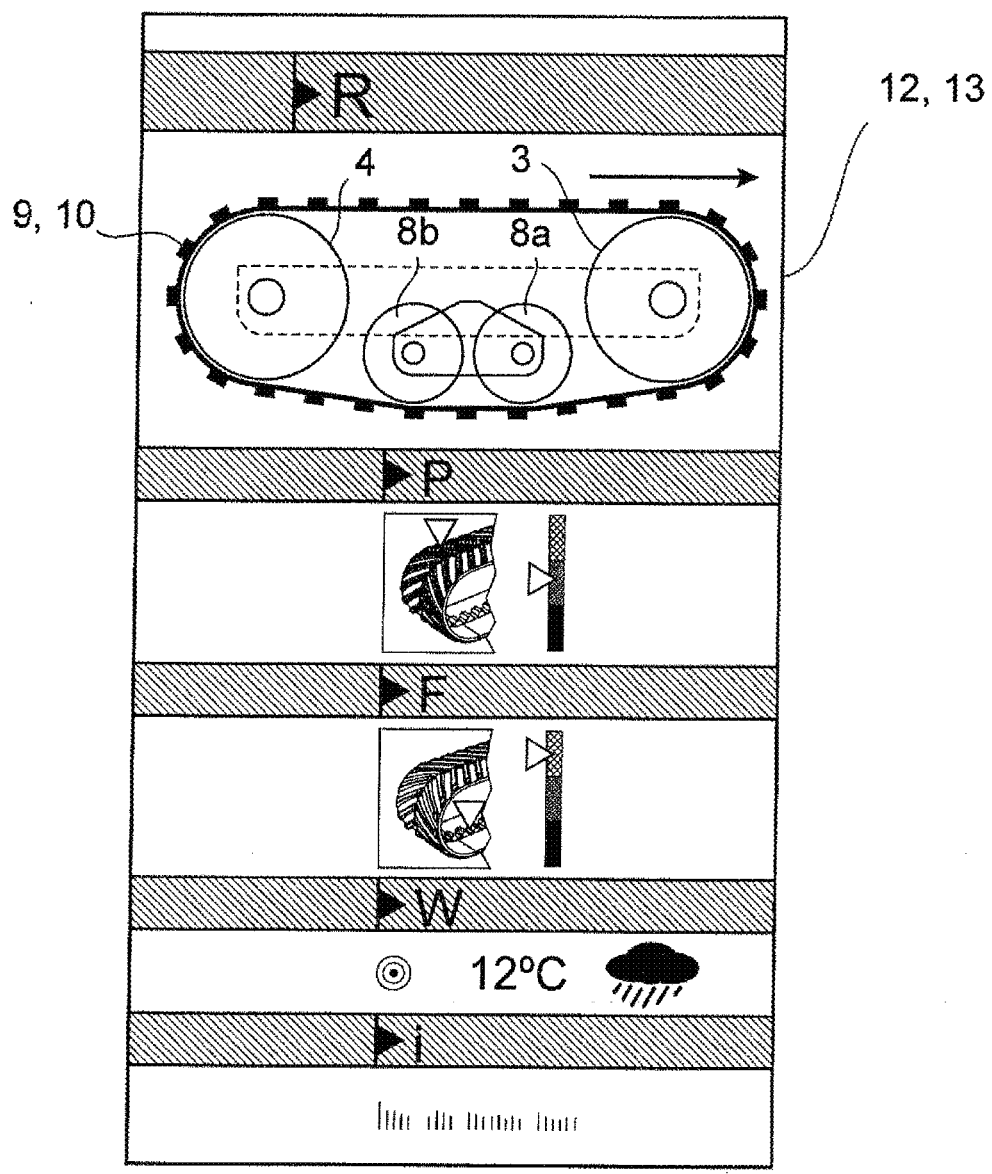
FIG. 3 shows a representation of pieces of driver information according to a second exemplary embodiment.
Figure 4:
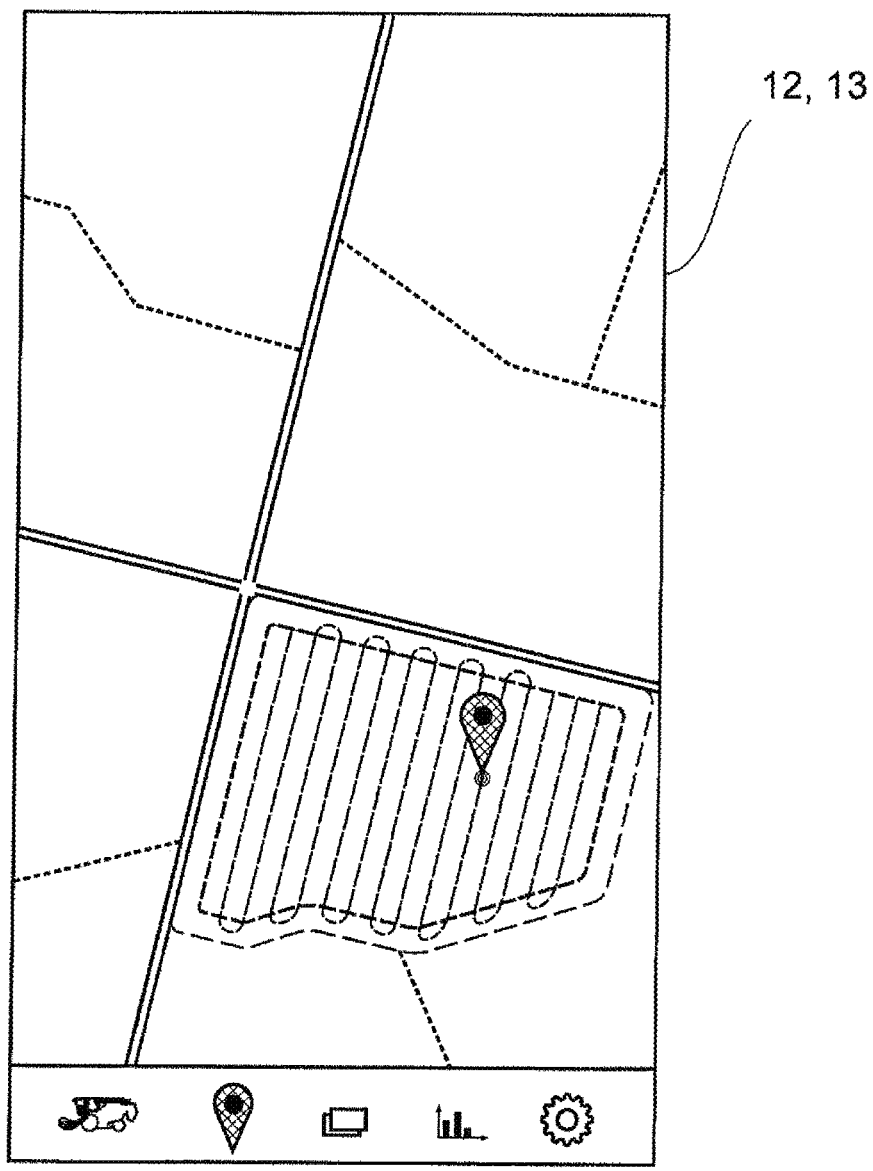
FIG. 4 shows a representation of pieces of driver information according to a third exemplary embodiment.
Figure 5:
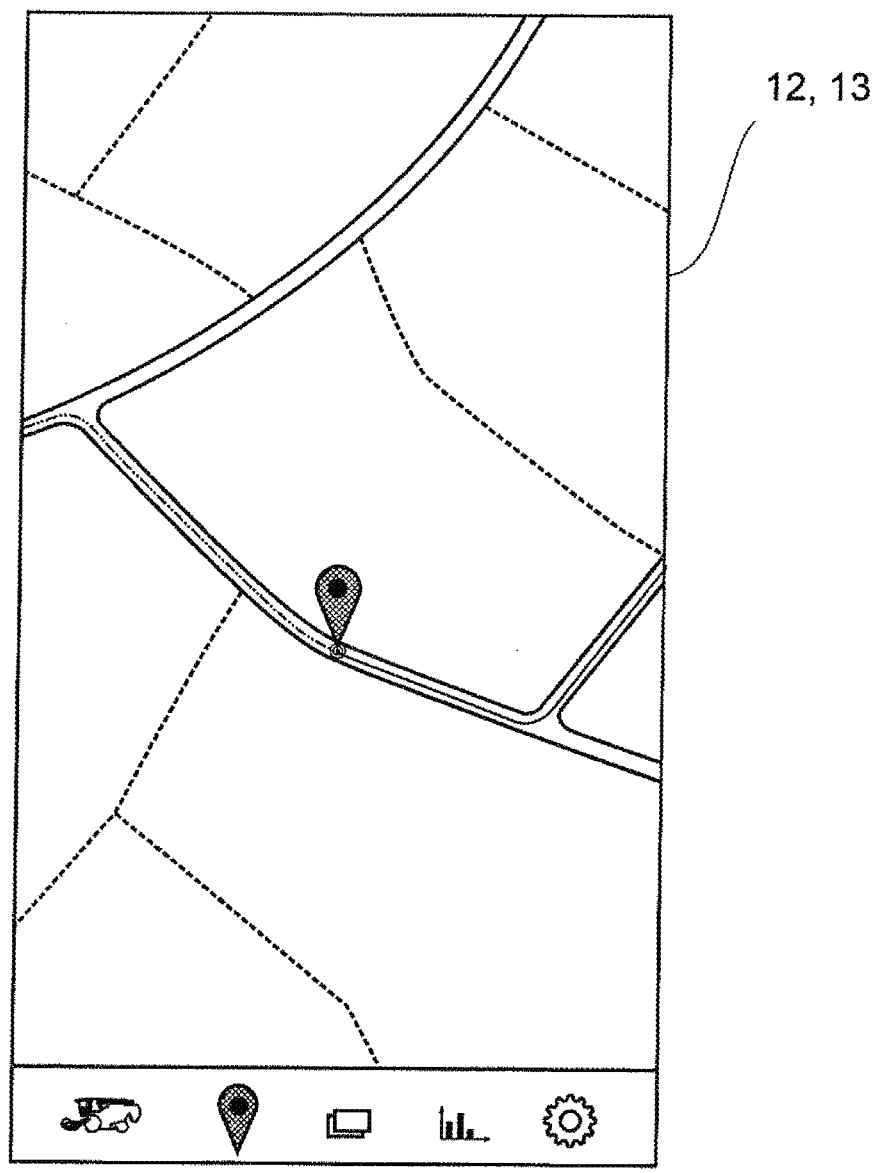
FIG. 5 shows a representation of pieces of driver information according to a fourth exemplary embodiment.

Alternative or additional pieces of driver information including further details are represented in FIGS. 3 to 5.

In FIG. 3, the degree of wear for the right track belt 9 is graphically represented, for example, also in real time, although not on the real image, and, in fact, for the profile depth of the outer lugs (view P), on the one hand, and for the width of the radially inner guide blocks or guide teeth (view F), on the other hand. The wear of the outer lugs is located in a central area in this case. The wear of the guide blocks and teeth is not critical, however. In addition, a view W is provided, in which information regarding the ambient temperature and the weather for the present location are displayed. In yet one further view i, even further pieces of information can be displayed, in particular, in a text-based manner, for example, recommendations for a preferred ground speed and/or an upcoming maintenance. In principle, in addition to the degree of wear, information regarding the remaining service life can also be displayed.

In FIG. 4, the GPS position of the agricultural tracked vehicle 1 within an agricultural field is represented as a further piece of driver information, wherein, in particular, a map which is freely available from the Internet is used as the map in this case. Moreover, the route traveled on the agricultural field is represented in this case. The route traveled on the agricultural field is incorporated, once again, into the determination of the operating state. In FIG. 5, the GPS position of the agricultural vehicle 1 on a road is represented as a further piece of driver information. In this case, the route traveled on the road is additionally represented. This is also incorporated into the determination of the operating state.

The operating states ascertained according to the solution according to the invention are all stored and, in particular, gathered, in a memory (not represented). The memory can be a component of the evaluation device 12 or of the driver assistance system 16 of the tracked vehicle 1 or an external memory, e.g., a farm-based computer. In particular, the memory is a memory of a working collective, which also contains corresponding operating data from other agricultural vehicles.

LIST OF REFERENCE CHARACTERS

1 tracked vehicle
2 ground drive 2a crawler track assembly
2b wheeled travel mechanism
3-5 ground drive wheels
6 track-laying units
7 tire
8a, 8b land wheels
9 track belt
10 ground engagement means
11 ground drive
12 evaluation device
13 smartphone
14 GPS sensor
15 acceleration sensor
16 driver assistance system
17 axle load sensor
18 operator
L direction of travel

What is claimed is:

1. A tracked vehicle comprising: a ground drive including at least two ground drive wheels, ground engagement elements assigned to individual ground drive wheels and/or units comprising several ground drive wheels, and an evaluation device configured for ascertaining an operating state of at least one of the ground engagement elements based at least on one state variable of the surroundings and vehicle-independent, device-specific sensor data, wherein the evaluation device is configured for evaluating vehicle speed, GPS position or geoposition of the tracked vehicle and acceleration data of the tracked vehicle as the vehicle-independent, the device-specific sensor data, wherein the evaluation device is configured for ascertaining the at least one state variable of the surroundings and wherein the at least one state variable comprises ambient temperature and weather data.

2. The tracked vehicle as claimed in claim 1, wherein the evaluation device is a mobile evaluation device selected from the group consisting of a smartphone, a tablet computer and a notebook, and/or the evaluation device comprises a keypad, a screen, and/or a touchscreen.

3. The tracked vehicle as claimed in claim 1, wherein the evaluation device comprises at least one sensor configured for generating the vehicle-independent, the device-specific sensor data.

4. The tracked vehicle as claimed in claim 1, wherein the evaluation device comprises a speed sensor, a GPS sensor, and/or an acceleration sensor.

5. The tracked vehicle as claimed in claim 1, wherein the evaluation device is configured for input, by an operator, and/or receipt of vehicle-specific data, and/or the at least one state variable of the surroundings.

6. The tracked vehicle as claimed in claim 5, wherein the evaluation device is configured for receiving input by the operator of an axle load of the vehicle, age of a particular ground engagement element, profile depth of the particular ground engagement element, and/or width of the inner guide blocks of the particular ground engagement element, as vehicle-specific data on vehicle type.

7. The tracked vehicle as claimed in claim 1, wherein the evaluation device is configured to evaluate vehicle-specific sensor data for ascertaining the operating state.

8. The tracked vehicle as claimed in claim 1, wherein the evaluation device is configured for displaying a piece of driver information and/or bringing about a display of the piece of driver information in a driver assistance system of the vehicle and/or bringing about a regulation of the vehicle via the driver assistance system of the vehicle, based on the ascertained operating state.

9. The tracked vehicle as claimed in claim 8, wherein the piece of driver information encompasses an operating state and/or remaining service life and/or recommendations for ground speed and/or for maintenance of a particular ground engagement element.

10. The tracked vehicle as claimed in claim 8, wherein the piece of driver information is displayed graphically and/or with the aid of augmented reality.

11. The tracked vehicle as claimed in claim 1, wherein the ascertained operating state is stored and/or gathered in a memory.

12. The tracked vehicle as claimed in claim 1, wherein the ground engagement element is free from sensors.

13. A method for detecting an operating state and/or determining a service life of at least one ground engagement element of a tracked vehicle, the at least one ground engagement element being assigned to individual ground drive wheels and/or units comprising several ground drive wheels of a ground drive of the tracked vehicle, comprising: ascertaining with an evaluation device an operating state of at least one of the at least one ground engagement element based at least on one or several state variables of the surroundings and vehicle-independent, device-specific sensor data, wherein the evaluation device is configured for ascertaining the at least one state variable of the surroundings and wherein the at least one state variable comprises ambient temperature and weather data.

* * * * *